United States Patent
Guan

(10) Patent No.: US 11,057,180 B2
(45) Date of Patent: Jul. 6, 2021

(54) FEEDBACK INFORMATION SENDING METHOD, FEEDBACK INFORMATION RECEIVING METHOD, ACCESS NETWORK DEVICE, AND TERMINAL

(71) Applicant: Huawei Technologies Co., Ltd., Shenzhen (CN)

(72) Inventor: Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/520,639

(22) Filed: Jul. 24, 2019

(65) Prior Publication Data

US 2019/0349174 A1 Nov. 14, 2019

Related U.S. Application Data

(63) Continuation of application No. PCT/CN2018/073384, filed on Jan. 19, 2018.

(30) Foreign Application Priority Data

Jan. 25, 2017 (CN) .......................... 201710062802.9

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1812* (2013.01); *H04W 84/042* (2013.01)

(58) Field of Classification Search
None
See application file for complete search history.

(56) References Cited

U.S. PATENT DOCUMENTS 8,976,754 B2 3/2015 Berggren et al.
2004/0042492 A1* 3/2004 Suzuki .................. H04L 1/1614
370/473

(Continued)

FOREIGN PATENT DOCUMENTS

CN 101615986 A 12/2009
CN 101689974 A 3/2010
(Continued)

OTHER PUBLICATIONS

LG Electronics, "Discussion on multiplexing of eMBB and URLLC", 3GPP TSG RAN WG1 NR Ad-hoc Meeting, R1-1700512, Spokane, USA, Jan. 16-20, 2017, total 10 pages.

(Continued)

*Primary Examiner* — Gerald A Smarth
(74) *Attorney, Agent, or Firm* — Slater Matsil, LLP

(57) ABSTRACT

A feedback Information sending method and a terminal are disclosed. In an embodiment a method includes receiving, by a terminal device within a first transmission time interval (TTI), a transport block (TB) sent by an access network device, wherein the TB comprises at least two code blocks (CBs), and wherein the at least two CBs comprise a first part of the CBs and a second part of the CBs and sending, by the terminal device, first feedback information and second feedback information to the access network device when the terminal device receives the second part of the CBs within a second TTI and does not receive the first part of the CBs, wherein the first feedback information indicates whether the terminal device correctly decodes the first part of the CBs, wherein the second feedback information indicates whether the terminal device correctly decodes the second part of the CBs, and wherein the second TTI is after the first TTI in a time sequence.

19 Claims, 9 Drawing Sheets

(51) Int. Cl.
*H04L 1/18* (2006.01)
*H04W 84/04* (2009.01)

(56) References Cited

U.S. PATENT DOCUMENTS

| | | | |
|---|---|---|---|
| 2008/0090528 A1* | 4/2008 | Malladi | H04L 1/0004 455/70 |
| 2008/0095106 A1* | 4/2008 | Malladi | H04L 5/0057 370/329 |
| 2009/0046650 A1 | 2/2009 | Dalsgaard et al. | |
| 2009/0077456 A1* | 3/2009 | Pi | H04L 1/0051 714/807 |
| 2009/0313516 A1* | 12/2009 | Shin | H04L 1/0009 714/748 |
| 2010/0027495 A1* | 2/2010 | Che | H04L 1/1854 370/329 |
| 2013/0294357 A1 | 11/2013 | Shimanuki et al. | |
| 2014/0201586 A1 | 7/2014 | Pajukoski et al. | |
| 2015/0016432 A1 | 1/2015 | Meyer et al. | |
| 2015/0085674 A1 | 3/2015 | Wu | |
| 2016/0205679 A1 | 7/2016 | Yoo et al. | |
| 2016/0226643 A1 | 8/2016 | Mallik et al. | |
| 2016/0233999 A1 | 8/2016 | Chendamarai Kannan et al. | |
| 2018/0019838 A1* | 1/2018 | Yeo | H04L 5/0094 |
| 2019/0020444 A1* | 1/2019 | Froberg Olsson | H04L 1/1819 |
| 2020/0099474 A1* | 3/2020 | Wikstrom | H04L 1/0075 |
| 2020/0136783 A1* | 4/2020 | Takeda | H04L 1/0043 |
| 2020/0195386 A1* | 6/2020 | Marinier | H04L 1/1896 |

FOREIGN PATENT DOCUMENTS

| | | |
|---|---|---|
| CN | 102255712 A | 11/2011 |
| CN | 102355341 A | 2/2012 |
| CN | 102648596 A | 8/2012 |
| CN | 103918207 A | 7/2014 |
| CN | 104283651 A | 1/2015 |
| CN | 104301077 A | 1/2015 |
| KR | 20080088665 A | 10/2008 |
| KR | 20100041884 A | 4/2010 |
| WO | 2010115295 A1 | 10/2010 |

OTHER PUBLICATIONS

Samsung, "Discussion on partial retransmission for eMBB", 3GPP TSG RAN WG1 Meeting NR#1, R1-1700959, Spokane, USA, Jan. 16-20, 2017, total 4 pages.

Samsung, "Summary of e-mail discussions on multiplexing eMBB and URLLC in DL", TSG-RAN WG1 NR Ad-hoc Meeting, R1-1700972, Spokane, USA, Jan. 16-20, 2017, total 23 pages.

\* cited by examiner

FEEDBACK INFORMATION SENDING METHOD, FEEDBACK INFORMATION RECEIVING METHOD, ACCESS NETWORK DEVICE, AND TERMINAL

CROSS-REFERENCE TO RELATED APPLICATIONS

This application is a continuation of International Application No. PCT/CN2018/073384, filed on Jan. 19, 2018, which claims priority to Chinese Patent Application No. 201710062802.9, filed on Jan. 25, 2017. The disclosures of the aforementioned applications are hereby incorporated by reference in their entireties.

TECHNICAL FIELD

This application relates to the information transmission field, and more specifically, to a feedback information sending method, a feedback information receiving method, an access network device, and a terminal device.

BACKGROUND

In a current long term evolution (LTE) system, both hybrid automatic repeat request (HARQ) feedback and information retransmission are specific to a transport block (TB). For example, an access network device sends a TB to a terminal device, and the terminal device feeds back an acknowledgement (ACK) bit to the access network device only after the terminal device successfully decodes all code blocks (CB) in the received TB. However, the terminal device feeds back a negative acknowledgement NACK) bit to the access network device for the entire TB provided that there is one unsuccessfully decoded CB. Correspondingly, after receiving the NACK feedback sent by the terminal device, because the access network device is unclear about a specific CB that is successfully decoded by the terminal device and a specific CB that fails to be decoded by the terminal device, the access network device subsequently performs HARQ retransmission on all the CBs in the entire TB even if the terminal device correctly decodes most of the CBs.

Apparently, in an information transmission process, the terminal device gives a feedback on the entire TB to the access network device, and the access network device retransmits the TB. Consequently, transmission efficiency of a system significantly decreases.

SUMMARY

Embodiments provide a feedback information sending method and a feedback information receiving method, to improve transmission efficiency of a system.

According to a first embodiment, this application provides a feedback information sending method. The method includes: receiving, by a terminal device within a first transmission time interval TTI, a transport block TB sent by an access network device, where the TB includes at least two code blocks CBs, and the at least two CBs include a first part of the CBs and a second part of the CBs; and if the terminal device, within a second TTI, receives the second part of the CBs sent by the access network device, and does not receive the first part of the CBs, sending, by the terminal device, first feedback information and second feedback information to the access network device, where the first feedback information is used to feed back whether the terminal device correctly decodes the first part of the CBs, the second feedback information is used to feed back whether the terminal device correctly decodes the second part of the CBs, and the second TTI is after the first TTI in a time sequence.

Optionally, duration of the second TTI is less than duration of the first TTI, or duration of the second TTI is equal to duration of the first TTI. For example, the first TTI may be a normal TTI, and the second TTI is a short TTI.

It may be understood that in this embodiment of this application, the access network device initially transmits one TB to the terminal device within the first TTI, and retransmits only some CBs in the TB within the second TTI. Therefore, the duration of the second TTI is less than the duration of the first TTI. This helps improve transmission efficiency of a system.

In a possible implementation, the sending, by the terminal device, first feedback information and second feedback information to the access network device includes: sending, by the terminal device, the first feedback information to the access network device within a third TTI, and sending the second feedback information to the access network device within a fourth TTI, where the third TTI and the fourth TTI are different TTIs in terms of time.

In this embodiment, the terminal device, within the third TTI, sends only the first feedback information, and does not send the second feedback information. Similarly, the terminal device, within the fourth TTI, sends only the second feedback information, and does not send the first feedback information.

In a possible implementation, the terminal device sends the first feedback information and the second feedback information to the access network device within a fifth TTI.

In a possible implementation, the first feedback information is specifically used to feed back whether the terminal device correctly decodes the first part of the CBs received within the first TTI, and the second feedback information is specifically used to feed back whether the terminal device correctly decodes the second part of the CBs received within the second TTI.

In a possible implementation, the first feedback information includes a first part of the feedback information and a second part of the feedback information, the first part of the feedback information is used to feed back whether the terminal device correctly decodes the first part of the CBs received within the first TTI, and the second part of the feedback information is used to feed back whether the terminal device correctly decodes the second part of the CBs received within the first TTI; and the second feedback information is specifically used to feed back whether the terminal device correctly decodes the second part of the CBs received within the second TTI.

In a possible implementation, the method further includes: if the terminal device does not receive the second part of the CBs after the first TTI, sending, by the terminal device, third feedback information to the access network device, where the third feedback information is used to feed back, to the access network device, whether the terminal device correctly decodes the TB received within the first TTI.

Optionally, in this embodiment, that the terminal device does not receive the second part of the CBs after the first TTI includes that the terminal device does not receive the second part of the CBs within a receive time window after the first TTI.

In a possible implementation, the method further includes: sending, by the terminal device, fourth feedback information to the access network device within the third TTI, where the fourth feedback information is used to feed back, to the access network device, whether the terminal device correctly decodes the TB; and/or sending, by the terminal device, fifth feedback information to the access network device within the fourth TTI, where the fifth feedback information is used to feed back, to the access network device, whether the terminal device correctly decodes the TB.

In a possible implementation, the method further includes: sending, by the terminal device, sixth feedback information to the access network device within the fifth TTI, where the sixth feedback information is used to feed back, to the access network device, whether the terminal device correctly decodes the TB.

According to a second embodiment, this application provides a feedback information receiving method. The method includes: sending, by an access network device, a transport block TB to a terminal device within a first transmission time interval TTI, where the TB includes at least two code blocks CBs, and the at least two CBs include a first part of the CBs and a second part of the CBs; and if the access network device, within a second TTI, sends the second part of the CBs to the terminal device, and does not send the first part of the CBs to the terminal device, receiving, by the access network device, first feedback information and second feedback information that are sent by the terminal device, where the first feedback information is used to feed back whether the terminal device correctly decodes the first part of the CBs, the second feedback information is used to feed back whether the terminal device correctly decodes the second part of the CBs, and the second TTI is after the first TTI in a time sequence.

In a possible implementation, the receiving, by the access network device, first feedback information and second feedback information that are sent by the terminal device includes: receiving, by the access network device within a third TTI, the first feedback information sent by the terminal device, and receiving, within a fourth TTI, the second feedback information sent by the terminal device, where the third TTI and the fourth TTI are different TTIs in terms of time.

In a possible implementation, the receiving, by the access network device, first feedback information and second feedback information that are sent by the terminal device includes: receiving, by the access network device within a fifth TTI, the first feedback information and the second feedback information that are sent by the terminal device.

In a possible implementation, the first feedback information is specifically used to feed back whether the terminal device correctly decodes the first part of the CBs received within the first TTI, and the second feedback information is specifically used to feed back whether the terminal device correctly decodes the second part of the CBs received within the second TTI.

In a possible implementation, the first feedback information includes a first part of the feedback information and a second part of the feedback information, the first part of the feedback information is used to feed back whether the terminal device correctly decodes the first part of the CBs received within the first TTI, and the second part of the feedback information is used to feed back whether the terminal device correctly decodes the second part of the CBs received within the first TTI; and the second feedback information is specifically used to feed back whether the terminal device correctly decodes the second part of the CBs received within the second TTI.

In a possible implementation, the method further includes: receiving, by the access network device, third feedback information sent by the terminal device, where the third feedback information is sent to the access network device by the terminal device after the terminal device does not receive, after the first TTI, the second part of the CBs sent by the access network device, and the third feedback information is used to feed back whether the terminal device correctly decodes the TB received within the first TTI.

In a possible implementation, the method further includes: receiving, by the access network device within the third TTI, fourth feedback information sent by the terminal device, where the fourth feedback information is used to feed back whether the terminal device correctly decodes the TB; and/or receiving, by the access network device within the fourth TTI, fifth feedback information sent by the terminal device, where the fifth feedback information is used to feed back whether the terminal device correctly decodes the TB.

In a possible implementation, the method further includes: receiving, by the access network device within the fifth TTI, sixth feedback information sent by the terminal device, where the sixth feedback information is used to feed back whether the terminal device correctly decodes the TB.

According to a third embodiment, an embodiment of this application provides a feedback information sending method. The method includes: receiving, by a terminal device within a first transmission time interval TTI, a transport block TB sent by an access network device, where the TB includes at least two code blocks CBs, and the at least two CBs include a first part of the CBs and a second part of the CBs; and if the terminal device, within a second TTI, receives the second part of the CBs sent by the access network device, and does not receive the first part of the CBs, sending, by the terminal device, first feedback information to the access network device within a third TTI, where the first feedback information is used to feed back whether the terminal device correctly decodes the first part of the CBs received within the first TTI and the second part of the CBs received within the second TTI, the second TTI is in a receive time window after the first TTI, and the receive time window is used by the terminal device to determine maximum duration for waiting for the access network device to send the second part of the CBs after the first TTI.

In a possible implementation, the method further includes: if the terminal device does not receive the second part of the CBs in the receive time window, sending, by the terminal device, second feedback information to the access network device within a fourth TTI, where the second feedback information is used to feed back, to the access network device, whether the terminal device correctly decodes the TB received within the first TTI, and the fourth TTI is the same as the third TTI or the fourth TTI is before the third TTI in a time sequence.

In a possible implementation, the method further includes: if the terminal device receives the second part of the CBs within a fifth TTI outside the receive time window, sending, by the terminal device, third feedback information to the access network device within a sixth TTI, where the third feedback information is used to feed back, to the access network device, whether the terminal device correctly decodes the TB and/or the second part of the CBs received within the fifth TTI.

It should be noted that, generally, the sixth TTI is after the third TTI in a time sequence. However, if duration occupied by the second part of the CBs retransmitted by the access network device within the second TTI is far less than a length of one TTI, decoding processing and feedback for the second part of the CBs may be performed in advance. In this case, there is no strict limitation that the sixth TTI should be after the third TTI in a time sequence.

According to a fourth embodiment, this application provides a feedback information receiving method. The method includes: sending, by an access network device, a transport block TB to a terminal device within a first transmission time interval TTI, where the TB includes at least two code blocks CBs, and the at least two CBs include a first part of the CBs and a second part of the CBs; and if the access network device, within a second TTI, sends the second part of the CBs to the terminal device, and does not send the first part of the CBs to the terminal device, receiving, by the access network device within a third TTI, first feedback information sent by the terminal device, where the first feedback information is used to feed back whether the terminal device correctly decodes the first part of the CBs received within the first TTI and the second part of the CBs received within the second TTI, the second TTI is in a receive time window after the first TTI, and the receive time window is used by the terminal device to determine maximum duration for waiting for the access network device to send the second part of the CBs after the first TTI.

In a possible implementation, the method further includes: if the access network device does not send the second part of the CBs to the terminal device in the receive time window, receiving, by the access network device, second feedback information sent by the terminal device within a fourth TTI, where the second feedback information is used to feed back whether the terminal device correctly decodes the TB received within the first TTI, and the fourth TTI is the same as the third TTI or the fourth TTI is before the third TTI in a time sequence.

In a possible implementation, the method further includes: if the access network device, within a fifth TTI outside the receive time window, sends the second part of the CBs to the terminal device, and does not send the first part of the CBs to the terminal device, receiving, by the access network device, third feedback information sent by the terminal device within a sixth TTI, where the third feedback information is used to feed back whether the terminal device correctly decodes the TB and/or the second part of the CBs received within the fifth TTI.

Generally, the sixth TTI is after the third TTI in a time sequence. However, if duration occupied by the second part of the CBs retransmitted by the access network device within the second TTI is far less than a length of one TTI, there is no strict limitation that the sixth TTI should be after the third TTI in a time sequence.

According to a fifth embodiment, an embodiment of this application provides a terminal device, configured to perform the method in any one of the first embodiment or the possible implementations of the first embodiment. Specifically, the terminal device includes units for performing the method in any one of the first embodiment or the possible implementations of the first embodiment.

According to a sixth embodiment, this application provides an access network device, configured to perform the method in any one of the second embodiment or the possible implementations of the second embodiment. Specifically, the access network device includes units for performing the method in any one of the second embodiment or the possible implementations of the second embodiment.

According to a seventh embodiment, an embodiment of this application provides a terminal device, configured to perform the method in any one of the third embodiment or the possible implementations of the third embodiment. Specifically, the terminal device includes units for performing the method in any one of the third embodiment or the possible implementations of the third embodiment.

According to an eighth embodiment, this application provides an access network device, configured to perform the method in any one of the fourth embodiment or the possible implementations of the fourth embodiment. Specifically, the access network device includes units for performing the method in any one of the fourth embodiment or the possible implementations of the fourth embodiment.

According to a ninth embodiment, this application provides a terminal device. The terminal device includes a processor and a memory. The memory is configured to store a computer program, and the processor is configured to invoke the computer program from the memory and run the computer program. When the program is run, the processor performs the method in any one of the first embodiment or the possible implementations of the first embodiment.

According to a tenth embodiment, this application provides an access network device. The access network device includes a processor and a memory. The memory is configured to store a computer program, and the processor is configured to invoke the computer program from the memory and run the computer program. When the program is run, the processor performs the method in any one of the second embodiment or the possible implementations of the second embodiment.

According to an eleventh embodiment, this application provides a terminal device. The terminal device includes a processor and a memory. The memory is configured to store a computer program, and the processor is configured to invoke the computer program from the memory and run the computer program. When the program is run, the processor performs the method in any one of the third embodiment or the possible implementations of the third embodiment.

According to a twelfth embodiment, this application provides an access network device. The access network device includes a processor and a memory. The memory is configured to store a computer program, and the processor is configured to invoke the computer program from the memory and run the computer program. When the program is run, the processor performs the method in any one of the fourth embodiment or the possible implementations of the fourth embodiment.

According to a thirteenth embodiment, this application provides a computer-readable storage medium. The computer-readable storage medium stores an instruction. When the instruction is run on a computer, the computer performs the method in any one of the first embodiment or the possible implementations of the first embodiment.

According to a fourteenth embodiment, this application provides a computer-readable storage medium. The computer-readable storage medium stores an instruction. When the instruction is run on a computer, the computer performs the method in any one of the second embodiment or the possible implementations of the second embodiment.

According to a fifteenth embodiment, this application provides a computer-readable storage medium. The computer-readable storage medium stores an instruction. When the instruction is run on a computer, the computer performs the method in any one of the third embodiment or the possible implementations of the third embodiment.

According to a sixteenth embodiment, this application provides a computer-readable storage medium. The computer-readable storage medium stores an instruction. When the instruction is run on a computer, the computer performs the method in any one of the fourth embodiment or the possible implementations of the fourth embodiment.

According to a seventeenth embodiment, this application provides a chip system. The chip system includes a processor, configured to implement functions of the terminal device in any one of the first embodiment and the possible implementations of the first embodiment, for example, receive or send data and/or information in the foregoing method. In a possible design, the chip system further includes a memory. The memory is configured to store a program instruction and data that are necessary for the terminal device. The chip system may include a chip, or may include a chip and another discrete device.

According to an eighteenth embodiment, this application provides a chip system. The chip system includes a processor, configured to implement functions of the access network device in any one of the second embodiment and the possible implementations of the second embodiment, for example, receive or send data and/or information in the foregoing method. In a possible design, the chip system further includes a memory. The memory is configured to store a program instruction and data that are necessary for the access network device. The chip system may include a chip, or may include a chip and another discrete device.

According to a nineteenth embodiment, this application provides a chip system. The chip system includes a processor, configured to implement functions of the terminal device in any one of the third embodiment and the possible implementations of the third embodiment, for example, receive or send data and/or information in the foregoing method. In a possible design, the chip system further includes a memory. The memory is configured to store a program instruction and data that are necessary for the terminal device. The chip system may include a chip, or may include a chip and another discrete device.

According to a twentieth embodiment, this application provides a chip system. The chip system includes a processor, configured to implement functions of the access network device in any one of the fourth embodiment and the possible implementations of the fourth embodiment, for example, receive or send data and/or information in the foregoing method. In a possible design, the chip system further includes a memory. The memory is configured to store a program instruction and data that are necessary for the access network device. The chip system may include a chip, or may include a chip and another discrete device.

According to a twenty-first embodiment, this application provides a computer program product. The computer program product includes computer program code. When the computer program code is run on a computer, the computer performs the method performed by the terminal device in any one of the first embodiment and the possible implementations of the first embodiment.

According to a twenty-second embodiment, this application provides a computer program product. The computer program product includes computer program code. When the computer program code is run on a computer, the computer performs the method performed by the access network device in any one of the second embodiment and the possible implementations of the second embodiment.

According to a twenty-third embodiment, this application provides a computer program product. The computer program product includes computer program code. When the computer program code is run on a computer, the computer performs the method performed by the terminal device in any one of the third embodiment and the possible implementations of the third embodiment.

According to a twenty-fourth embodiment, this application provides a computer program product. The computer program product includes computer program code. When the computer program code is run on a computer, the computer performs the method performed by the access network device in any one of the fourth embodiment and the possible implementations of the fourth embodiment.

In the embodiments of this application, after the access network device sends the transport block TB including the plurality of CBs to the terminal device, the terminal device separately gives feedbacks on a correctly-decoded CB and an incorrectly-decoded CB, so that the access network device retransmits only the incorrectly-decoded CB. In the prior art, the terminal device gives a feedback on the entire TB, and the access network device subsequently retransmits the entire TB if the terminal device does not correctly decode all the CBs. Therefore, the access network device needs to retransmit the entire TB even if only some CBs or even a few CBs are not correctly decoded by the terminal device. In contrast, in the feedback information sending method and the feedback information receiving method that are provided in the embodiments of this application, the correctly-decoded CB is prevented from being repeatedly sent, thereby improving transmission efficiency of the system.

DETAILED DESCRIPTION OF ILLUSTRATIVE EMBODIMENTS

Figure 1:
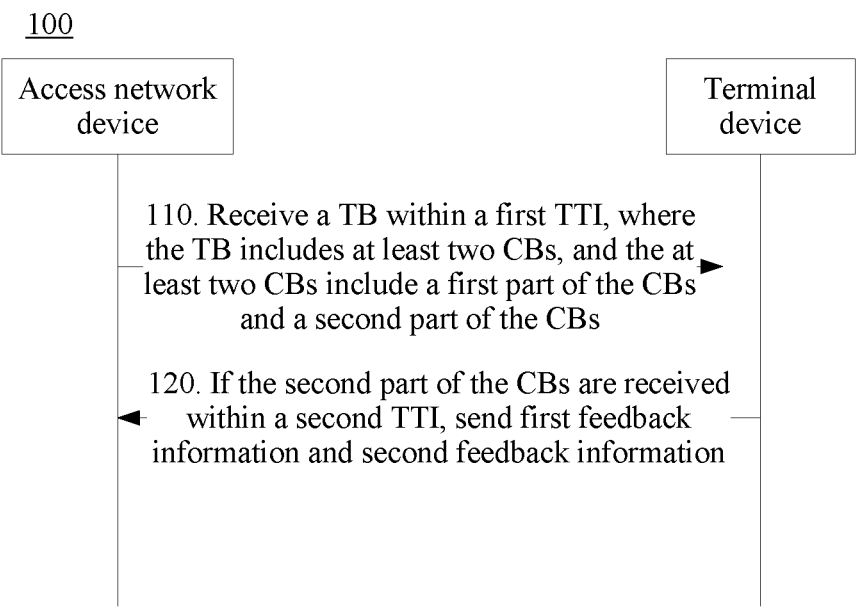
FIG. 1 is a schematic interaction diagram of a feedback information sending method 100 according to an embodiment of this application.

The following describes technical solutions of this application with reference to accompanying drawings.

First, related concepts in the embodiments of this application are briefly explained.

Transport block TB and code block CB: In the prior art, one TB is split into a plurality of CBs for independent channel coding and decoding. For example, for a Turbo code, a maximum quantity of bits of one CB is 6144. To be specific, if a quantity of bits of a TB exceeds 6144, the TB needs to be split into a plurality of CBs for independent channel coding and decoding. For a low-density parity-check code (LDPC), a maximum quantity of bits of one CB is approximately 2000. Likewise, if a quantity of bits of a TB exceeds 2000, the TB needs to be split into more CBs for independent coding and decoding.

In addition, each CB has an independent check function. The Turbo code is used as an example. Cyclic redundancy check (CRC) is performed on each CB before coding. Correspondingly, after decoding a CB, the UE can determine, through CRC check, whether the CB is correctly decoded.

An access network device in the embodiments of this application may be an evolved NodeB (eNB or eNodeB for short), a macro base station, a micro base station (also referred to as a "small cell"), a pico base station, an access point (AP), a transmission point (TP), a radio network controller, or the like in a long term evolution (LTE) system, or may be a gNodeB in a new radio (NR) system, or the like.

A terminal device may also be referred to as user equipment (UE), a mobile station (MS), a mobile terminal, or the like. The terminal device may communicate with one or more core networks by using a radio access network (RAN). For example, the terminal device may be a mobile phone (also referred to as a "cellular" phone) or a computer having a mobile terminal, or may be a portable mobile apparatus, a pocket-sized mobile apparatus, a handheld mobile apparatus, a computer built-in mobile apparatus, an in-vehicle mobile apparatus, or a terminal device in a future communications system (for example, 5G).

In the existing LTE system, both hybrid automatic repeat request (HARQ) feedback and information retransmission are performed in a form of transport blocks (TB). For example, an access network device sends a TB to a terminal device, and the terminal device feeds back an acknowledgement (ACK) bit to the access network device only after the terminal device successfully decodes all code blocks (CB) in the received TB. However, the terminal device feeds back a negative acknowledgement (NACK) bit to the access network device for the entire TB provided that there is one unsuccessfully decoded CB. Correspondingly, after receiving the NACK feedback sent by the terminal device, because the access network device is unclear about a specific CB that is successfully decoded by the terminal device and a specific CB that fails to be decoded by the terminal device, the access network device subsequently performs HARQ retransmission on all the CBs in the entire TB even if the terminal device correctly decodes most of the CBs.

In a future communications technology (for example, 5G), two important technical requirements for enhanced mobile broadband (eMBB) and ultra-reliable and low latency communications (URLLC) are introduced. For the eMBB, data transmission in 5G reaches a higher rate compared with 4G. Therefore, a larger TB may be introduced. In addition, considering that a low-density parity-check code (LDPC) with higher parallelism may be introduced, one TB in 5G may be split into more CBs compared with 4G.

When one TB may be split into more CBs, if only a few of the CBs received by UE are not correctly decoded and a large quantity of CBs are correctly decoded, continuing using a prior-art manner in which HARQ feedback and retransmission are performed for the TB greatly affects transmission efficiency of a system.

Figure 2:
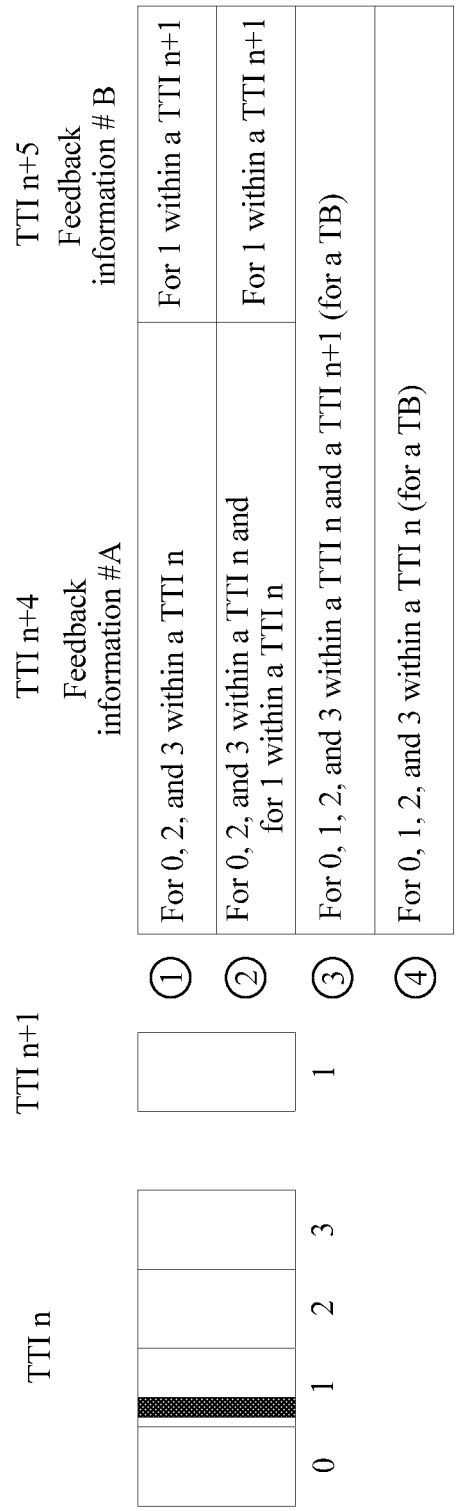
FIG. 2 is a schematic diagram of sending feedback information according to an embodiment of this application.
Figure 3:
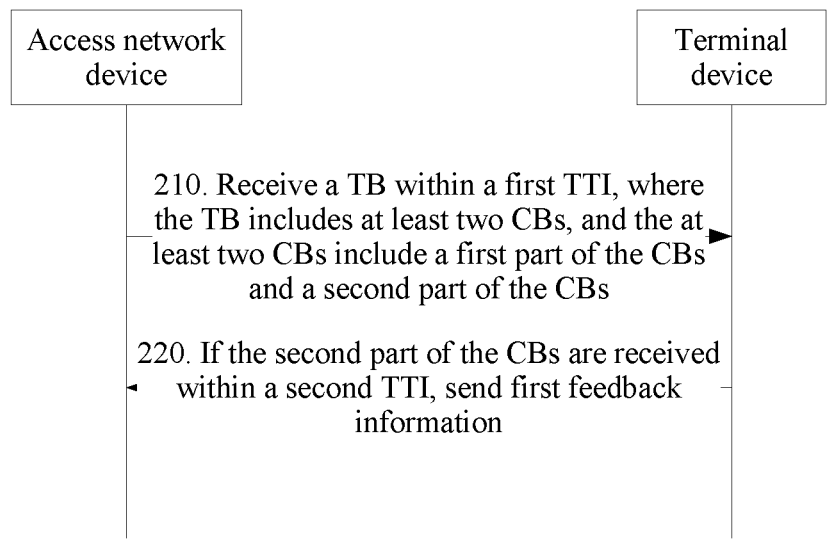
FIG. 3 is a schematic interaction diagram of a feedback information sending method 200 according to another embodiment of this application.

In view of this, the embodiments of this application provide a feedback information sending method and a feedback information receiving method, to improve transmission efficiency of a system. With reference to FIG. 1 to FIG. 3, the following describes in detail the feedback information sending method and the feedback information receiving method that are provided in the embodiments of this application.

The following numbers "first" and "second" in the embodiments of this application are only used to distinguish between different objects, for example, to distinguish between different TTIs or different information.

FIG. 1 is a schematic interaction diagram of a feedback information sending method 100 according to an embodiment of this application. As shown in FIG. 1, the method 100 mainly includes steps 110 and 120.

110. A terminal device receives, within a first TTI, a TB sent by an access network device, where the TB includes at least two CBs, and the at least two CBs include a first part of the CBs and a second part of the CBs.

120. If the terminal device, within a second TTI, receives the second part of the CBs sent by the access network device, and does not receive the first part of the CBs, the terminal device sends first feedback information and second feedback information to the access network device. The access network device receives the first feedback information and the second feedback information that are sent by the terminal device.

The first feedback information is used to feed back whether the terminal device correctly decodes the first part of the CBs, the second feedback information is used to feed back whether the terminal device correctly decodes the second part of the CBs, and the second TTI is after the first TTI in a time sequence.

It should be noted that the second feedback information is used to feed back whether the terminal device correctly decodes the second part of the CBs. Optionally, in an embodiment, the second part of the CBs herein are not limited to the second part of the CBs received by the terminal device within the first TTI, or the second part of the CBs that are retransmitted by the access network device and that are received within the second TTI.

Alternatively, optionally, in another embodiment, the second part of the CBs herein are the retransmitted CBs received by the terminal device within the second TTI. In this case, there is a possibility that the terminal device finds that some CBs are retransmitted. To be specific, in this case, the access network device indicates, to the terminal device, that current retransmission includes the second part of the CBs, but does not include the first part of the CBs. In this way, the terminal device understands that the second part of the CBs in previous initial transmission are affected CBs, for example, CBs that are punctured or interfered with, and therefore the terminal device does not perform HARQ combination on decoding information of the second part of the CBs in the current retransmission and decoding information of the second part of the CBs in the previous initial transmission, and does not consider the second part of the CBs in the previous initial transmission during decoding.

Alternatively, the access network device may directly indicate, to the terminal device, that the second part of the CBs in current retransmission are CBs affected in previous initial transmission, and therefore the terminal device does not perform HARQ combination on decoding information of the second part of the CBs in the current retransmission and decoding information of the second part of the CBs in the previous initial transmission, and does not consider the second part of the CBs in the previous initial transmission during decoding.

It should be understood that in this embodiment of this application, the first part of the CBs and the second part of the CBs are two parts of one TB. Alternatively, it may be understood that all CBs in one TB are considered as a universal set, the universal set includes two subsets, one subset includes the first part of the CBs, and the other subset includes the second part of the CBs. The first part of the CBs and the second part of the CBs may not overlap at all, in other words, the first part of the CBs and the second part of the CBs do not include a same CB. Alternatively, the first part of the CBs and the second part of the CBs may partially overlap, in other words, the first part of the CBs and the second part of the CBs include a same CB.

The foregoing eMBB service and URLLC service are used as an example. When the access network device occupies some time-frequency resources to send eMBB service data to the terminal device, URLLC service data may need to be sent suddenly. The URLLC service has a low latency requirement, and a priority of the URLLC service is higher than that of the eMBB service. Therefore, the access network device may puncture, for a short time, a TB that is used to send the eMBB service data, to send the URLLC service with a higher service priority. Alternatively, the access network device may send, in a superposition manner, the URLLC service data on a TB on which the eMBB service data has been sent.

It may be understood that due to the puncturing the TB by the access network device, it is very likely that some CBs in the TB cannot be received by the terminal device because the CBs are punctured for the URLLC service data. Alternatively, in a superposition-based sending case, because URLLC sending causes interference to eMBB sending, it is very likely that the terminal device cannot correctly decode a CB on which the URLLC service data and the eMBB service data are sent in a superposition manner.

In this example, a CB that is not punctured or on which the URLLC service data and the eMBB service data are not sent in a superposition manner is the first part of the CBs. On the contrary, a CB that is punctured or on which the service data is sent in a superposition manner is the second part of the CBs.

It should be noted that in the foregoing example, the puncturing specifically means that eMBB transmission is covered (or rewritten) by URLLC transmission. To be specific, the access network device transmits the URLLC service data instead of the eMBB service data on some time-frequency resources on which the eMBB service data originally needs to be sent (or has been sent).

The superposition-based sending means that the URLLC service data is also transmitted on a time-frequency resource on which the eMBB service data is transmitted.

The first part of the CBs and the second part of the CBs are distinguished mainly in consideration that division can be performed on a basis that a decoding probability of the first part of the CBs and a decoding probability of the second part of the CBs are independent of each other. To be specific, decoding probability correlation between CBs in the first part of the CBs is relatively large, and decoding probability correlation between CBs in the second part of the CBs is also relatively large, but decoding correlation between the first part of the CBs and the second part of the CBs is not large. Specifically, for example, a second part of CBs in a TB of eMBB are punctured for URLLC or are used to send URLLC in a superposition manner, but a first part of the CBs are not affected by the URLLC. In this case, it is very likely that the second part of the CBs are not correctly decoded, but there is a larger probability that the first part of the CBs are correctly decoded. For another example, a URLLC service in a neighboring cell causes inter-cell interference to a second part of CBs in a TB of eMBB in a current cell, but causes no interference to a first part of the CBs. Likewise, it is very likely that the second part of the CBs are not correctly decoded, but there is a larger probability that the first part of the CBs are correctly decoded. Other similar cases are not limited provided that the decoding probability of the first part of the CBs and the decoding probability of the second part of the CBs can be independent of each other.

Specifically, that the terminal device sends the first feedback information and the second feedback information to the access network device includes: sending the first feedback information and the second feedback information to the access network device within a same TTI. Alternatively, the terminal device may send the first feedback information and the second feedback information to the access network device within different TTIs.

FIG. 2 is a schematic diagram of sending feedback information according to an embodiment of this application. As shown in FIG. 2, that a terminal device sends feedback information to an access network device mainly includes the following processes.

(1) Within a TTI n, the access network device sends a TB to the terminal device, where the TB includes four code blocks CBs (as shown in FIG. 2, the four CBs are sequentially denoted as a CB #0, a CB #1, a CB #2, and a CB #3). Each CB carries eMBB service data. The terminal device receives the TB.

In addition, a time-frequency resource occupied by the code block CB #1 is punctured for URLLC service data, or is used to send URLLC service data in a superposition manner.

It should be noted that only one TB is used as an example in FIG. 2. Apparently, the access network device may send one or more TBs to the terminal device, and the terminal device gives feedbacks to the access network device in the same process. Herein, only one TB is used as an example for description.

It may be understood that in a puncturing-based sending case, because the eMBB service data is no longer transmitted on the punctured CB, the terminal device can receive only partial eMBB service data (from CBs that are not punctured), but cannot receive eMBB service data that originally needs to be transmitted on the punctured CB. In a superposition-based sending case, due to strong interference of the URLLC service data, there is a high probability that a CB (namely, the CB #1) that carries both the eMBB service data and the URLLC service data cannot be correctly received by the terminal device.

In this embodiment of this application, before the terminal device feeds back a result of decoding the TB, the access network device retransmits the CB (namely, an example of a second part of CBs) used for puncturing-based sending or superposition-based sending, in other words, performs step 202.

(2) Within a TTI n+1, the access network device retransmits the CB #1 to the terminal device.

(3) The terminal device feeds back a decoding result (to be specific, about whether the TB is correctly decoded) to the access network device.

It should be noted that (3) and (2) are performed in different time sequences in different feedback manners. This should be subject to specific implementations of the following embodiments.

Optionally, in an embodiment, the terminal device sends first feedback information to the access network device within a third TTI, and sends second feedback information to the access network within a fourth TTI, where the third TTI and the fourth TTI are different TTIs in terms of time.

In this embodiment, the terminal device respectively feeds back a result of decoding a first part of the CBs and a result of decoding the second part of the CBs to the access network device within different TTIs by using the first feedback information and the second feedback information.

Optionally, in an embodiment, the terminal device sends first feedback information and second feedback information to the access network device within a fifth TTI.

To be specific, in this embodiment of this application, after the terminal device receives the first part of the CBs and the second part of the CBs that are sent by the access network device, and further receives the second part of the CBs retransmitted by the access network device, the terminal device separately feeds back, to the access network device, whether the first part of the CBs are correctly decoded and whether the second part of the CBs are correctly decoded. Specifically, the first feedback information used to feed back whether the first part of the CBs are correctly decoded and the second feedback information used to feed back whether the second part of the CBs are correctly decoded may be sent to the access network device within a same TTI, or may be sent to the access network device within different TTIs.

After the access network device retransmits the second part of the CBs to the terminal device, the terminal device uses different feedback manners based on whether the terminal device receives the retransmitted second part of the CBs in a receive time window after a first TTI. The following separately describes the manners.

It should be noted that "whether the retransmitted second part of the CBs are received" herein means whether the terminal device receives a downlink control channel sent by the access network device. The downlink control channel is used to schedule a data channel, the data channel is used to carry a TB that is to be sent to the terminal device by the access network device, and the TB includes the second part of the CBs.

Case 1:

The terminal device receives, in the receive time window, the second part of the CBs retransmitted by the access network device.

Specifically, the following several optional feedback manners are included in Case 1.

Manner 1:

Optionally, in an embodiment, the first feedback information is specifically used to feed back whether the terminal device correctly decodes the first part of the CBs received within the first TTI, and the second feedback information is specifically used to feed back whether the terminal device correctly decodes the second part of the CBs received within a second TTI.

With reference to the foregoing steps 201 and 202, referring to a feedback manner ① in FIG. 2, the terminal device sends feedback information #A to the access network device within a TTI n+4, to feed back, to the access network device, whether the CB #0, the CB #2, and the CB #3 that are received within the TTI n are correctly decoded; and sends feedback information #B to the access network device within a TTI n+5, to feed back, to the access network device, whether the retransmitted CB #1 received within the TTI n+1 is correctly decoded.

Manner 2:

Optionally, in an embodiment, the first feedback information includes a first part of the feedback information and a second part of the feedback information, the first part of the feedback information is used to feed back whether the terminal device correctly decodes the first part of the CBs received within the first TTI, and the second part of the feedback information is used to feed back whether the terminal device correctly decodes the second part of the CBs received within the first TTI; and the second feedback information is specifically used to indicate whether the terminal device correctly decodes the second part of the CBs received within a second TTI.

Referring to a feedback manner ② in FIG. 2, the terminal device sends feedback information #A to the access network device within a TTI n+4. Specifically, the feedback information #A includes two pails of feedback information, a first part of the feedback information is used to indicate whether the CB #0, the CB #2, and the CB #3 that are received within the TTI n are correctly decoded, and a second part of the feedback information is used to indicate whether the CB #1 received within the TTI n is correctly decoded. The terminal device sends feedback information #B to the access network device within a TTI n+5, to feed back, to the access network device, whether the CB #1 received within the TTI n+1 is correctly decoded.

It may be learned, from the foregoing descriptions of the TB and the CB, that cyclic redundancy check of one TB includes two layers of CRC check: CRC check (a first layer of CRC check) for each CB included in the TB and CRC check (a second layer of CRC check) for the entire TB.

It should be understood that the two layers of CRC check are performed in consideration that CRC check on all CBs in one TB succeeds, but actually, some CBs on which CRC check succeeds may not be correctly decoded. In other words, false alarms may occur in decoding of these CBs. In addition, a quantity of false alarms increases as the TB is divided into more CBs. Therefore, after CRC check on each CB succeeds, CRC check further needs to be performed on the entire TB. In this way, once false alarms occur in some CBs, CRC check on the entire TB does not succeed even if CRC check on all the CBs succeeds. Therefore, it can be accurately determined whether each CB in the TB is correctly decoded.

In this embodiment of this application, considering that false alarms may occur in CRC check on some CBs, a concept of the two layers of CRC check is applied to independent feedbacks on the first part of the CBs and the second part of the CBs.

Optionally, in an embodiment, the terminal device sends fourth feedback information to the access network device within the third TTI, where the fourth feedback information is used to feed back whether the terminal device correctly decodes the TB; and/or the terminal device sends fifth feedback information to the access network device within the fourth TTI, where the fifth feedback information is used to feed back whether the terminal device correctly decodes the TB.

With reference to the foregoing descriptions, when the terminal device gives feedbacks to the access network device within different TTIs, the terminal device sends the first feedback information to the access network device within the third TTI, to feed back whether the terminal device correctly decodes the first part of the CBs; and sends the second feedback information to the access network device within the fourth TTI, to feed back whether the terminal device correctly decodes the second part of the CBs. In this embodiment, the terminal device also sends the fourth feedback information within the third TTI, to feed back whether the TB is correctly decoded. Alternatively, the terminal device also sends the fifth feedback information within the fourth TTI, to feed back whether the TB is correctly decoded.

Optionally, in an embodiment, the terminal device sends sixth feedback information to the access network device within the fifth TTI, where the sixth feedback information is used to feed back whether the terminal device correctly decodes the TB.

Similarly, when sending the first feedback information and the second feedback information to the access network device within a same TTI (namely, the fifth TTI), the terminal device may also send the sixth feedback information to the access network device within the fifth TTI, to feed back whether the terminal device correctly decodes the TB. This manner can avoid a false alarm that may occur in a process in which the terminal device decodes the CB.

In the foregoing manner 1 and manner 2, the second part of the CBs that are sent by the access network device within the second TTI and that are received by the terminal device are received by the terminal device in the receive time window after the first TTI. The receive time window is used by the terminal device to determine maximum duration for waiting for the access network device to retransmit the second part of the CBs after the first TTI.

It should be noted that duration of the receive time window is determined mainly in consideration of a processing time for receiving and decoding the TB or the CB by the terminal device and a packet assembly time for generating feedback information after decoding.

Specifically, the terminal device cannot send the feedback information within the third TTI in a timely manner if the duration of the receive time window is too long, for example, if an end point of the receive time window is relatively close to a start point of the third TTI. To control the receive time window and a corresponding processing time, duration occupied by the retransmitted second part of the CBs in the second TTI is usually less than duration of the second TTI, but the entire TB can occupy the entire first TTI in terms of time during initial transmission within the first TTI. In this way, the terminal device may perform decoding processing on the second part of the CBs received within the second TTI and packet assembly on the corresponding feedback information before the second TTI ends. Correspondingly, the duration of the receive time window may alternatively be reserved based on the duration occupied by the retransmitted second part of the CBs. For example, if the duration of the second TTI is four times the duration occupied by the retransmitted second part of the CBs, it may be determined that the end point of the receive time window is an end point of the second TTI, to be specific, the receive time window includes four candidate locations for sending the retransmitted second part of the CBs by the access network device. Certainly, another similar manner of determining the receive time window and selection of the duration occupied by the retransmitted second part of the CBs are not excluded provided that both the processing time for receiving and decoding the TB or the CB and the packet assembly time for generating the feedback information after decoding can be considered.

In the foregoing manner 1 and manner 2, when receiving, in the receive time window, the second part of the CBs sent by the access network device, the terminal device separately gives feedbacks on the first part of the CBs and the second part of the CBs. The following shows another feedback manner used by the terminal device when the terminal device receives, in the receive time window after the first TTI, the second part of the CBs retransmitted by the access network device.

FIG. 3 is a schematic interaction diagram of a feedback information sending method 200 according to another embodiment of this application. As shown in FIG. 3, the method 200 mainly includes steps 210 and 220.

Manner 3:

210. A terminal device receives, within a first TTI, a transport block TB sent by an access network device, where the TB includes at least two code blocks CBs, and the at least two CBs include a first part of the CBs and a second part of the CBs.

220. If the terminal device, within a second TTI, receives the second part of the CBs sent by the access network device, and does not receive the first part of the CBs, the terminal device sends first feedback information to the access network device within a third TTI based on whether the first part of the CBs received within the first TTI and the second part of the CBs received within the second TTI are correctly decoded, where the first feedback information is used to feed back whether the terminal device correctly decodes the first part of the CBs received within the first TTI and the second part of the CBs received within the second TTI, and the second TTI is in a receive time window after the first TTI.

It may be understood that in the foregoing method 100, the terminal device receives the TB that is sent by the access network device within the first TTI and that includes the first part of the CBs and the second part of the CBs. Subsequently, if the terminal device, within the second TTI, further receives the second part of the CBs sent by the access network device, and does not receive the first part of the CBs, the terminal device separately feeds back, to the access network device, whether the first part of the CBs are correctly decoded and whether the second part of the CBs are correctly decoded.

Like the method 100, in the method 200, the terminal device receives the TB that is sent by the access network device within the first TTI and that includes the first part of the CBs and the second part of the CBs, and the terminal device receives, in the receive time window after the first TTI, the second part of the CBs sent by the access network device within the second TTI. A difference lies in that in manner 1 and manner 2, the terminal device separately decodes the CBs received within the first TTI and the CBs received within the second TTI, and feeds back decoding results to the access network device, but in Manner 3, the terminal device jointly feeds back, to the access network device, whether the first part of the CBs received within the first TTI are correctly decoded and whether the second part of the CBs received within the second TTI are correctly decoded.

In other words, in this embodiment of this application, if the terminal device receives, in the receive time window after the first TTI within which the access network device sends the TB, some CBs (namely, the second part of the CBs) that are retransmitted by the access network device, the terminal device jointly decodes the received CBs.

It should be understood that the joint decoding herein means decoding all CBs (including an initially-transmitted CB and a retransmitted CB) that belong to a same TB and that are received within different TTIs. Further, with reference to a result of the decoding, a decoding result (to be specific, about whether the entire TB is correctly decoded) for the entire TB is fed back to the access network device.

In this embodiment of this application, the receive time window is used by the terminal device to determine maximum duration for waiting for the access network device to send the second part of the CBs after the first TTI.

In other words, after receiving the TB sent by the access network device within the first TTI, the terminal device monitors, in the receive time window after the first TTI, whether the access network device continues to retransmit data. If the terminal device receives, within the second TTI in the receive time window after the first TTI, the CBs retransmitted by the access network device, the terminal device jointly decodes the entire TB based on the first part of the CBs and the second part of the CBs that are received within the first TTI and the retransmitted CBs (to be specific, the second part of the CBs) received within the second TTI, and subsequently feeds back a result of the joint decoding to the access network device.

The second part of the CBs herein are not limited to the second part of the CBs received by the terminal device within the first TTI, or the second part of the CBs that are retransmitted by the access network device and that are received within the second TTI.

Optionally, in another embodiment, the second part of the CBs herein are the retransmitted CBs received by the terminal device within the second TTI. In this case, there is a possibility that the terminal device finds that the CBs received within the second TTI are some retransmitted CBs. In this case, the access network device needs to indicate, to the terminal device, that current retransmission includes the second part of the CBs, but does not include the first part of the CBs. In this way, the terminal device determines the second part of the CBs in previous initial transmission as affected CBs (for example, CBs that are punctured or interfered with). Therefore, the terminal device does not perform HARQ combination on decoding information of the second part of the CBs in the current retransmission and decoding information of the second part of the CBs in the previous initial transmission, and does not consider the second part of the CBs in the previous initial transmission during decoding.

Alternatively, the access network device may directly indicate, to the terminal device, that the second part of the CBs in current retransmission are CBs affected in previous initial transmission, and therefore the terminal device does not perform HARQ combination on decoding information of the second part of the CBs in the current retransmission and decoding information of the second part of the CBs in the previous initial transmission, and does not consider the second part of the CBs in the previous initial transmission during decoding.

Correspondingly, the terminal device monitors, in the receive time window after the first TTI, whether the access network device continues to retransmit a CB. If the terminal device receives, in the receive time window, no CB retransmitted by the access network device, the terminal device decodes, after the receive time window, the entire TB based on the first part of the CBs and the second part of the CBs that are received within the first TTI, and subsequently feeds back a decoding result to the access network device.

Continue to refer to FIG. 2. As shown in a manner in FIG. 2, the access network device sends the TB to the access network device within the TTI n, and the TB includes the code blocks CB #0, CB #1, CB #2, and CB #3. The access network device retransmits the CB #1 to the terminal device within the TTI n+1. In this embodiment, it is considered that the terminal device receives, in a receive time window after the TTI n, the CB #1 retransmitted by the access network device. In this case, the terminal device sends feedback information #A to the access network device within a TTI n+4, to feed back, to the access network device, whether the terminal device correctly decodes the entire TB. Whether the terminal device correctly decodes the entire TB is fed back after the CB #0, the CB #1, the CB #2, and the CB #3 that are sent by the access network device within the TTI n and the CB #1 that is retransmitted by the access network device within the TTI n+1 are jointly decoded.

Optionally, in an embodiment, the method further includes:

if the terminal device does not receive the second part of the CBs in the receive time window, the terminal device sends second feedback information to the access network device within a fourth TTI, where the second feedback information is used to feed back whether the terminal device correctly decodes the TB received within the first TTI, and the fourth TTI is the same as the third TTI or the fourth TTI is before the third TTI in a time sequence.

It should be understood that the first feedback information is used to feed back whether the terminal device correctly decodes the TB received within the first TTI, to be specific, the terminal device decodes the entire TB only by using the first part of the CBs and the second part of the CBs that are received within the first TTI.

Optionally, in an embodiment, the method further includes:

if the terminal device receives the second part of the CBs within a fifth TTI in the receive time window, the terminal device sends third feedback information to the access network device within a sixth TTI, where the third feedback information is used to feed back, to the access network device, whether the terminal device correctly decodes the TB and/or the second part of the CBs received within the fifth TTI.

It should be noted that, if duration occupied by the retransmitted second part of the CBs is far less than a length of one TTI, decoding processing and feedback sending for the retransmitted second part of the CBs may be performed in advance. Therefore, there also is no strict limitation that the sixth TTI should be after the third TTI in a time sequence.

In addition, it should be further noted that the third feedback information and the foregoing first feedback information are independent feedback information, and/or the third feedback information and the foregoing second feedback information are independent feedback information. In other words, corresponding feedback information sent in the receive time window is independent of corresponding feedback information sent outside the receive time window. In addition, the sixth TTI used to send the third feedback information is independent of the third TTI used to send the first feedback information, and/or the sixth TTI used to send the third feedback information is independent of the fourth TTI used to send the second feedback information.

Specifically, as described above, if the terminal device does not receive, in the receive time window after the first TTI, some CBs (namely, the second part of the CBs) retransmitted by the access network device, the terminal device sends the first feedback information to the access network within the third TTI, to feed back whether the terminal device correctly decodes the entire TB based on the first part of the CBs and the second part of the CBs that are received within the first TTI. Subsequently, if the terminal device receives, within the fifth TTI outside the receive time window, the second part of the CBs sent by the access network device, the terminal device sends the third feedback information to the access network device on a basis that the terminal device has already sent the first feedback information to the access network device. Herein, the third feedback information includes a plurality of forms.

For example, the third feedback information is used to feed back whether the second part of the CBs received within the fifth TTI are correctly decoded.

Alternatively, the third feedback information is used to feed back whether the entire TB is correctly decoded. In this case, the terminal device jointly decodes the TB based on the first part of the CBs and the second part of the CBs that are received within the first TTI and the second part of the CBs that are received outside the receive time window, and feeds back a decoding result to the access network device by using the third feedback information.

Alternatively, the third feedback information is used to feed back both whether the second part of the CBs received within the fifth TTI are correctly decoded and whether the TB is correctly decoded.

In this embodiment of this application, in a case contrary to Case 1, after the access network device retransmits the second part of the CBs to the terminal device, the terminal device does not receive the retransmitted second part of the CBs.

Similarly, that "the second part of the CBs retransmitted by the access network device are not received" herein means that the terminal device does not receive a downlink control channel that is sent by the access network device and that is used to carry the retransmitted second part of the CBs.

Case 2:

The terminal device does not receive, in the receive time window, the second part of the CBs retransmitted by the access network device.

In other words, in Case 2, the terminal device receives the second part of the CBs outside the receive time window.

Optionally, in an embodiment, the method further includes:

if the terminal device does not receive the second part of the CBs after the first TTI, the terminal device sends third feedback information to the access network device, where the third feedback information is used to feed back whether the terminal device correctly decodes the TB received within the first TTI.

In some cases, the terminal device may miss detecting a control channel sent by the access network device. For example, the terminal device misses detecting a downlink control channel for retransmitting the second part of the CBs. In this case, the terminal device does not receive, in the receive time window, the second part of the CBs retransmitted by the access network device. In this case, the terminal device feeds back, to the access network device based on the CB #0, the CB #1, the CB #2, and the CB #3 that are sent by the access network device within the TTI n, whether the entire TB is correctly decoded.

Optionally, the terminal device sends missed-detection indication information to the access network device, where the missed-detection indication information is used to indicate that the terminal device misses detecting the downlink control channel.

Correspondingly, the access network device may process the missed-detection of the terminal device as a NACK feedback based on the missed-detection indication information.

Figure 4:
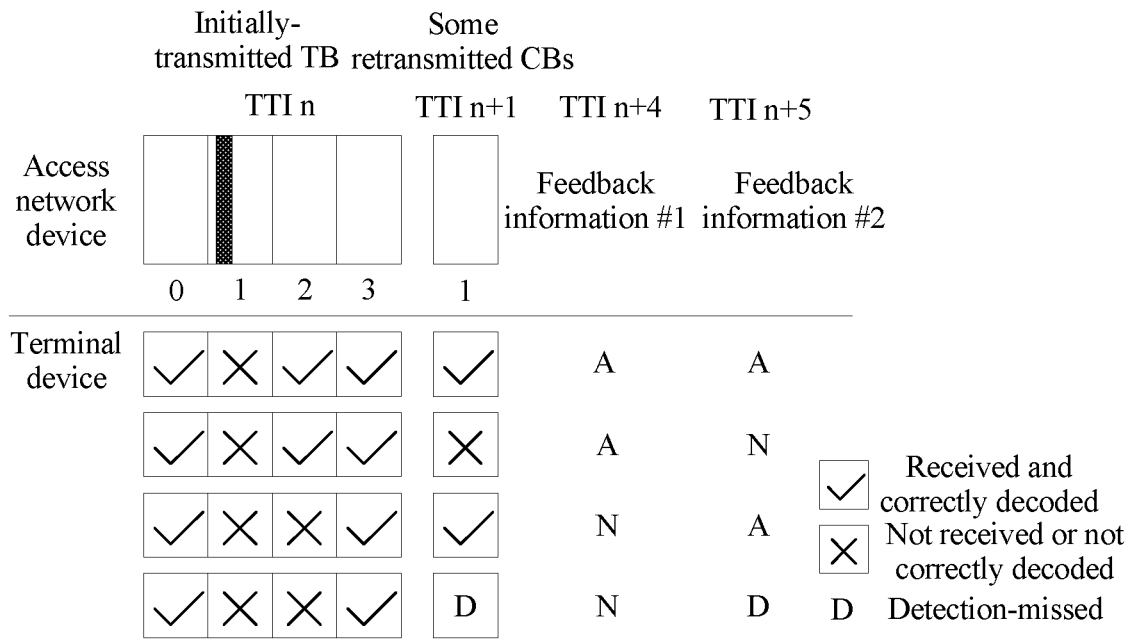
FIG. 4 shows an example of sending feedback information according to examples of this application.

FIG. 4 shows an example of sending feedback information according to examples of this application. As shown in FIG. 4, an access network device sends a TB including a CB #0, a CB #1, a CB #2, and a CB #3 to a terminal device within a TTI n, and retransmits the CB #1 within a TTI n+1. The terminal device sends feedback information #1 to the access network device within a TTI n+4, to feed back whether the CB #0, the CB #2, and the CB #3 (used as an example of a first part of CBs) that are received within the TTI n are correctly decoded; and sends feedback information #2 to the access network device within a TTI n+5, to feed back whether the CB #1 (used as an example of a second part of the CBs) received within the TTI n+1 is correctly decoded.

In addition, if the terminal device misses detecting the retransmitted CB, the terminal device sends missed-detection indication information to the access network device, to indicate, to the access network device, that the terminal device misses detecting the retransmitted CB. The access network device usually processes the missed-detection as incorrect decoding.

Figure 5:
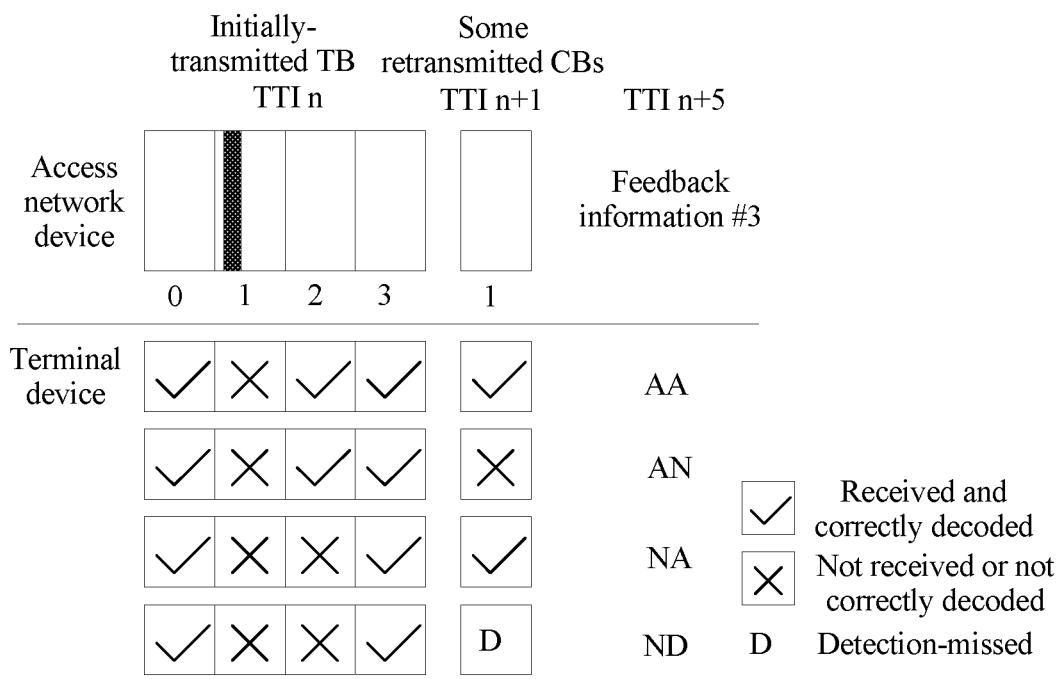
FIG. 5 shows another example of sending feedback information according to examples of this application.

FIG. 5 shows another example of sending feedback information according to examples of this application. Different from FIG. 4, a terminal device gives feedbacks on both a first part of CBs and a second part of the CBs within one TTI. In this feedback form, it may be considered that feedback information #3 sent by the terminal device to an access network device includes two parts of feedback information, for example, includes two indication bits. A first indication bit is used to indicate whether a CB #0, a CB #2, and a CB #3 that are received within a TTI n are correctly decoded. A second indication bit is used to indicate whether a CB #1 received within a TTI n+1 is correctly decoded.

Figure 6:
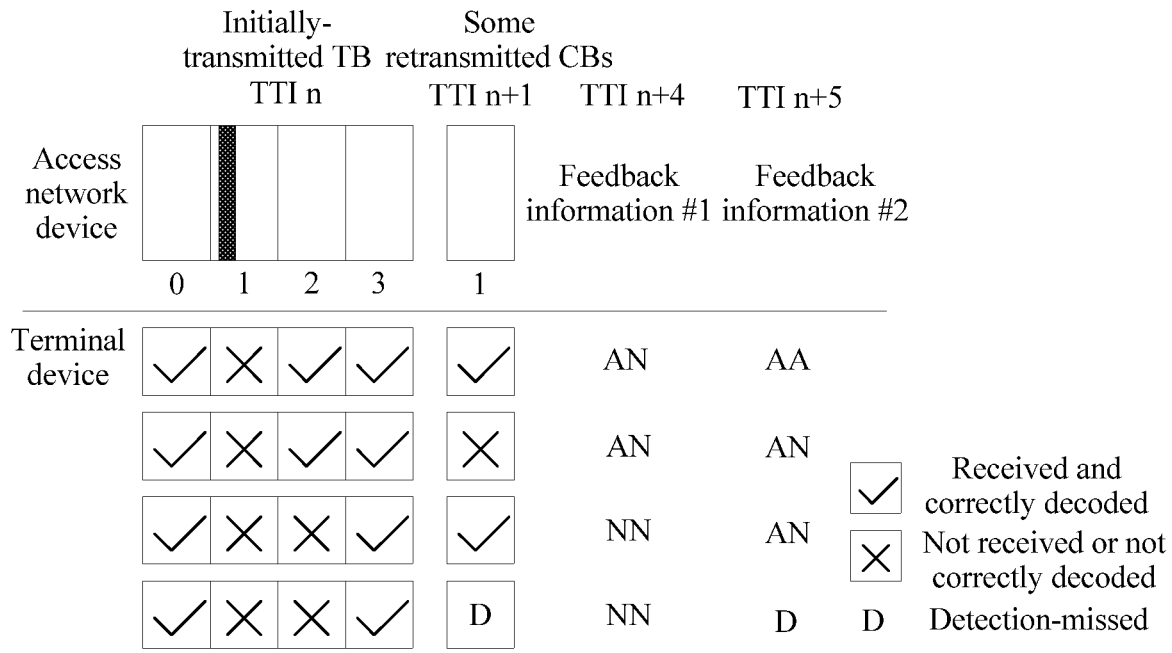
FIG. 6 shows still another example of sending feedback information according to examples of this application.

FIG. 6 shows still another example of sending feedback information according to examples of this application. As shown in FIG. 6, a terminal device separately feeds back, to an access network device within different TTIs, whether a CB #0, a CB #2, and a CB #3 that are received within a TTI n are correctly decoded and whether a CB #1 received within a TTI n+1 is correctly decoded. Further, in a feedback manner shown in FIG. 6, the terminal device feeds back, to the access network device within a TTI n+4, whether the CB #0, the CB #2, and the CB #3 are correctly decoded, and simultaneously feeds back, to the access network device, whether an entire TB can be correctly decoded based on the CB #0, the CB #1, the CB #2, and the CB #3 that are received within the TTI n; and/or the terminal device feeds back, to the access network device within a TTI n+5, whether a retransmitted CB (namely, the CB #1) is correctly decoded, and simultaneously feeds back, to the access network device, whether the entire TB can be correctly decoded based on the CB #0, the CB #1, the CB #2, and the CB #3 that are received within the TTI n and the TTI n+1.

Figure 7:
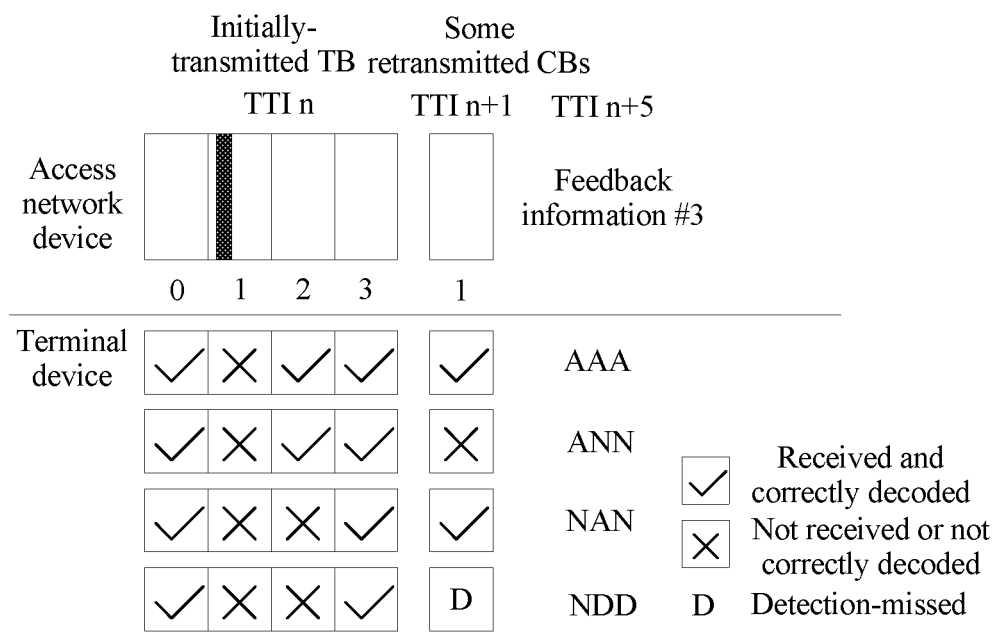
FIG. 7 shows yet another example of sending feedback information according to examples of this application.

FIG. 7 shows yet another example of sending feedback information according to examples of this application. In the feedback manner shown in FIG. 6, the terminal device gives feedbacks to the access network device within different TTIs. Different from FIG. 6, in FIG. 7, the terminal device feeds back, to the access network device within one TTI (a TTI n+5), both whether a CB #0, a CB #2, and a CB #3 that are received within a TTI n are correctly decoded and whether a CB #1 received within a TTI n+1 is correctly decoded. Simultaneously, the terminal device feeds back, to the access network device within the TTI n+5, whether an entire TB is correctly decoded based on the CB #0, the CB #2, and the CB #3 that are received within the TTI and the CB #1 received within the TTI n+1.

In the prior art, the terminal device gives a feedback on the entire TB, and the access network device subsequently retransmits the entire TB if the terminal device does not correctly decode all the CBs. Therefore, the access network device needs to retransmit the entire TB even if only some CBs or even a few CBs are not correctly decoded by the terminal device. In the embodiments of this application, after the access network device sends the transport block TB including the plurality of CBs to the terminal device, the terminal device separately gives feedbacks on a correctly-decoded CB and an incorrectly-decoded CB, so that the access network device retransmits only the incorrectly-decoded CB. In contrast, in the feedback information sending method and the feedback information receiving method that are provided in the embodiments of this application, the correctly-decoded CB is prevented from being repeatedly sent, thereby improving transmission efficiency of the system.

With reference to FIG. 1 to FIG. 7, the foregoing describes in detail the feedback information sending method and the feedback information receiving method that are provided in the embodiments of this application. With reference to FIG. 8 to FIG. 11, the following describes in detail an access network device and a terminal device that are provided in the embodiments of this application.

Figure 8:
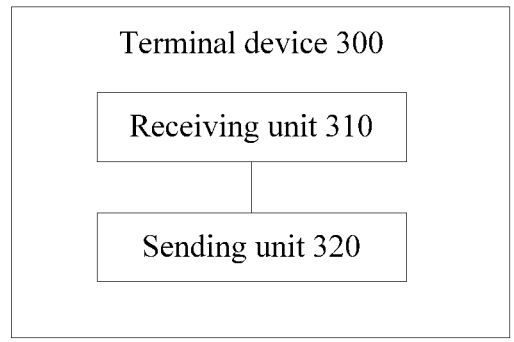
FIG. 8 is a schematic block diagram of a terminal device 300 according to an embodiment of this application.

FIG. 8 is a schematic block diagram of a terminal device 300 according to an embodiment of this application. As shown in FIG. 8, the terminal device 300 includes:

a receiving unit 310, configured to receive, within a first transmission time interval TTI, a transport block TB sent by an access network device, where the TB includes at least two code blocks CBs, and the at least two CBs include a first part of the CBs and a second part of the CBs; and a sending unit 320, configured to: if the receiving unit, within a second TTI, receives the second part of the CBs sent by the access network device, and does not receive the first part of the CBs, send first feedback information and second feedback information to the access network device, where the first feedback information is used to feed back whether the terminal device correctly decodes the first part of the CBs, the second feedback information is used to feed back whether the terminal device correctly decodes the second part of the CBs, and the second TTI is after the first TTI in a time sequence.

The foregoing and other operations or functions of the units in the terminal device 300 provided in this embodiment of this application are separately used to implement a corresponding procedure performed by the terminal device in the feedback information sending method 100 provided in the embodiments of this application. For brevity, details are not described herein.

Figure 9:
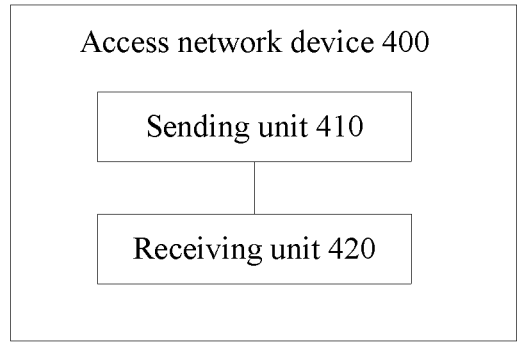
FIG. 9 is a schematic block diagram of an access network device 400 according to an embodiment of this application.

FIG. 9 is a schematic block diagram of an access network device 400 according to an embodiment of this application. As shown in FIG. 9, the access network device 400 includes:

a sending unit 410, configured to send a transport block TB to a terminal device within a first transmission time interval TTI, where the TB includes at least two code blocks CBs, and the at least two CBs include a first part of the CBs and a second part of the CBs; and a receiving unit 420, configured to: if the sending unit, within a second TTI, sends the second part of the CBs to the terminal device, and does not send the first part of the CBs to the terminal device, receive first feedback information and second feedback information that are sent by the terminal device, where the first feedback information is used to feed back whether the terminal device correctly decodes the first part of the CBs, the second feedback information is used to feed back whether the terminal device correctly decodes the second part of the CBs, and the second TTI is after the first TTI in a time sequence.

The foregoing and other operations or functions of the units in the access network device 400 provided in this embodiment of this application are separately used to implement a corresponding procedure performed by the access network device in the feedback information receiving method 100 provided in the embodiments of this application. For brevity, details are not described herein.

Figure 10:
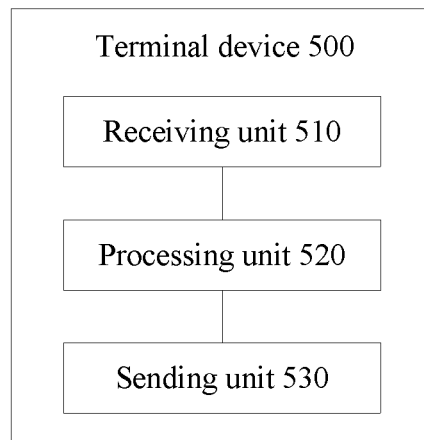
FIG. 10 is a schematic block diagram of a terminal device 500 according to an embodiment of this application.

FIG. 10 is a schematic block diagram of a terminal device 500 according to an embodiment of this application. As shown in FIG. 8, the terminal device 500 includes:

a receiving unit 510, configured to receive, within a first transmission time interval TTI, a transport block TB sent by an access network device, where the TB includes at least two code blocks CBs, and the at least two CBs include a first part of the CBs and a second part of the CBs, where the receiving unit 510 is further configured to receive, within a second TTI, the second part of the CBs sent by the access network device;

a processing unit 520, configured to: if the receiving unit, within the second TTI, receives the second part of the CBs sent by the access network device, and does not receive the first part of the CBs, determine whether the first part of the CBs received by the receiving unit within the first TTI and the second part of the CBs received by the receiving unit within the second TTI are correctly decoded; and a sending unit 530, configured to send first feedback information to the access network device within a third TTI, where the first feedback information is used to feed back whether the terminal device correctly decodes the first part of the CBs received by the receiving unit within the first TTI and the second part of the CBs received by the receiving unit within the second TTI, the second TTI is in a receive time window after the first TTI, and the receive time window is used by the processing unit to determine maximum duration for waiting for the access network device to send the second part of the CBs after the first TTI.

The foregoing and other operations or functions of the units in the terminal device 500 provided in this embodiment of this application are separately used to implement a corresponding procedure performed by the terminal device in the feedback information sending method 200 provided in the embodiments of this application. For brevity, details are not described herein.

Figure 11:
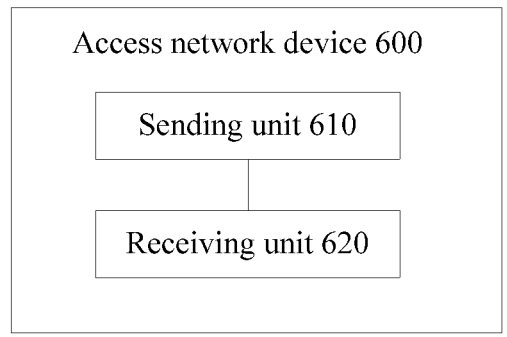
FIG. 11 is a schematic block diagram of an access network device 600 according to an embodiment of this application.

FIG. 11 is a schematic block diagram of an access network device 600 according to an embodiment of this application. As shown in FIG. 11, the access network device 600 includes:

a sending unit 610, configured to send a transport block TB to a terminal device within a first transmission time interval TTI, where the TB includes at least two code blocks CBs, and the at least two CBs include a first part of the CBs and a second part of the CBs; and a receiving unit 620, configured to: if the receiving unit, within a second TTI, sends the second part of the CBs to the terminal device, and does not send the first part of the CBs to the terminal device, receive, within a third TTI, first feedback information sent by the terminal device, where the first feedback information is used to feed back whether a processing unit correctly decodes the first part of the CBs received by the receiving unit within the first TTI and the second part of the CBs received by the receiving unit within the second TTI, the second TTI is in a receive time window after the first TTI, and the receive time window is used by the processing unit to determine maximum duration for waiting for the access network device to send the second part of the CBs after the first TTI.

The foregoing and other operations or functions of the units in the access network device 600 provided in this embodiment of this application are separately used to implement a corresponding procedure performed by the access network device in the feedback information receiving method 200 provided in the embodiments of this application. For brevity, details are not described herein.

Figure 12:
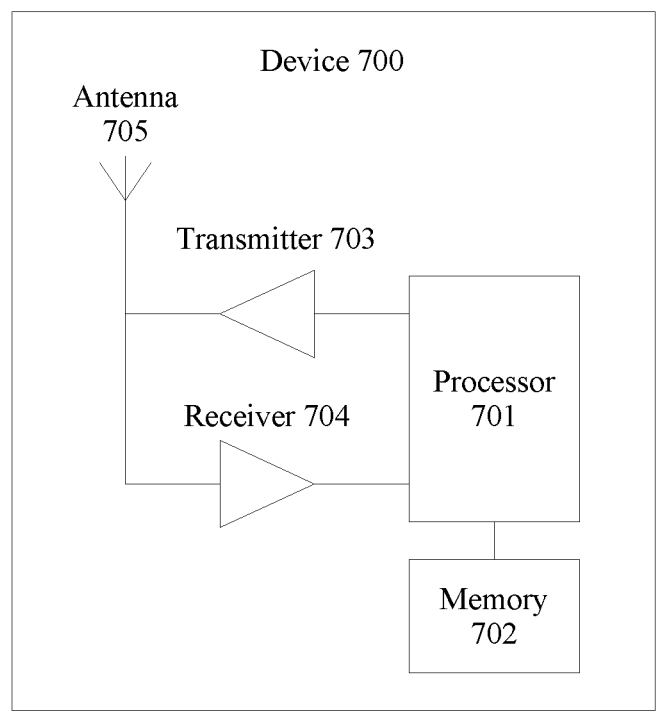
FIG. 12 is a schematic structural diagram of a terminal device 700 according to an embodiment of this application.

FIG. 12 is a schematic structural diagram of a terminal device 700 according to an embodiment of this application. As shown in FIG. 12, the terminal device 700 includes one or more processors 701, one or more memories 702, and one or more transceivers (each transceiver includes a transmitter 703 and a receiver 704). The transmitter 703 or the receiver 704 is connected to one or more antennas 705, and sends or receives a signal by using the antennas. The memory 702 stores a computer program instruction (or code). The processor 701 executes the computer program instruction stored in the memory 702, to implement a corresponding procedure and/or operation that are/is performed by the terminal device in the feedback information sending method 100 provided in the embodiments of this application. For brevity, details are not described herein.

It should be noted that the terminal device 300 shown in FIG. 8 may be implemented by the terminal device 700 shown in FIG. 12. For example, the receiving unit shown in FIG. 8 may be implemented by the receiver shown in FIG. 12, and the sending unit may be implemented by the transmitter.

Figure 13:
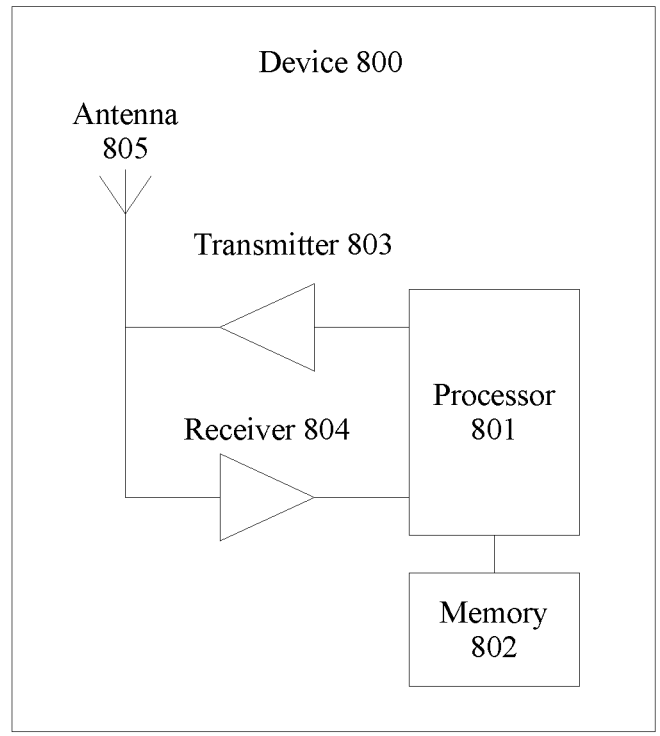
FIG. 13 is a schematic structural diagram of an access network device 800 according to an embodiment of this application.

FIG. 13 is a schematic structural diagram of an access network device 800 according to an embodiment of this application. As shown in FIG. 13, the access network device 800 includes one or more processors 801, one or more memories 802, and one or more transceivers (each transceiver includes a transmitter 803 and a receiver 804). The transmitter 803 or the receiver 804 is connected to one or more antennas 805, and sends or receives a signal by using the antennas. The memory 802 stores a computer program instruction (or code). The processor 801 executes the computer program instruction stored in the memory 802, to implement a corresponding procedure and/or operation that are/is performed by the access network device in the feedback information receiving method 100 provided in the embodiments of this application. For brevity, details are not described herein.

Similarly, the access network device 400 shown in FIG. 9 may be implemented by the access network device 800 shown in FIG. 13. For example, the sending unit shown in FIG. 9 may be implemented by the transmitter shown in FIG. 13, and the receiving unit may be implemented by the receiver.

Figure 14:
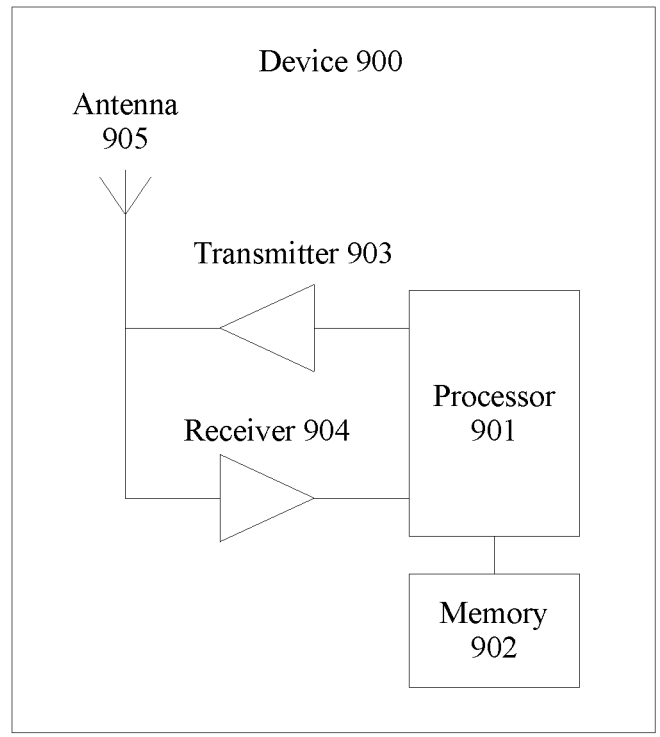
FIG. 14 is a schematic structural diagram of a terminal device 900 according to an embodiment of this application.

FIG. 14 is a schematic structural diagram of a terminal device 900 according to an embodiment of this application. As shown in FIG. 14, the terminal device 900 includes one or more processors 901, one or more memories 902, and one or more transceivers (each transceiver includes a transmitter 903 and a receiver 904). The transmitter 903 or the receiver 904 is connected to one or more antennas 905, and sends or receives a signal by using the antennas. The memory 902 stores a computer program instruction (or code). The processor 901 executes the computer program instruction stored in the memory 902, to implement a corresponding procedure and/or operation that are/is performed by the terminal device in the feedback information sending method 200 provided in the embodiments of this application. For brevity, details are not described herein.

Similarly, the terminal device 500 shown in FIG. 10 may be implemented by the terminal device 900 shown in FIG. 14. For example, the sending unit shown in FIG. 10 may be implemented by the transmitter shown in FIG. 14, the receiving unit may be implemented by the receiver, and the processing unit may be implemented by the processor.

Figure 15:
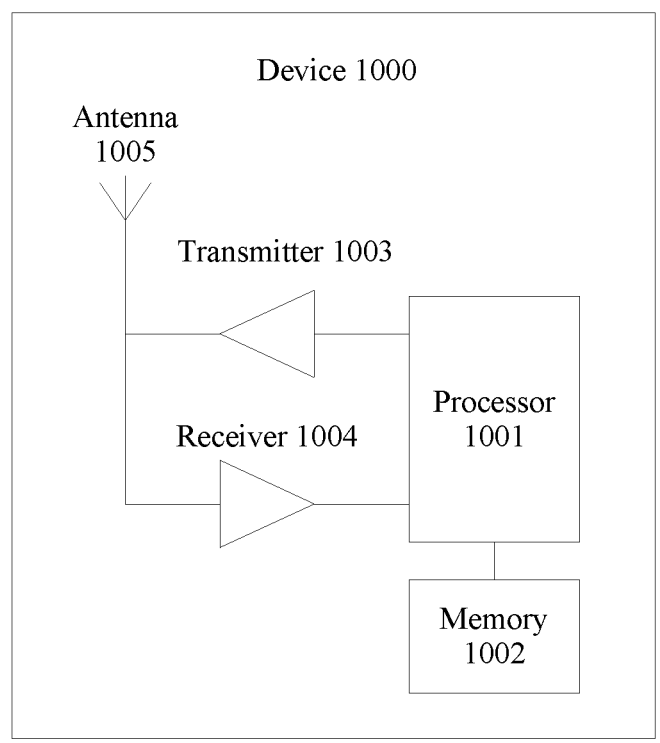
FIG. 15 is a schematic structural diagram of an access network device 1000 according to an embodiment of this application.

FIG. 15 is a schematic structural diagram of an access network device 1000 according to an embodiment of this application. As shown in FIG. 15, the access network device 1000 includes one or more processors 1001, one or more memories 1002, and one or more transceivers (each transceiver includes a transmitter 1003 and a receiver 1004). The transmitter 1003 or the receiver 1004 is connected to one or more antennas 1005, and sends or receives a signal by using the antennas. The memory 1002 stores a computer program instruction (or code). The processor 1001 executes the computer program instruction stored in the memory 1002, to implement a corresponding procedure and/or operation that are/is performed by the access network device in the feedback information receiving method 200 provided in the embodiments of this application. For brevity, details are not described herein.

Similarly, the access network device 600 shown in FIG. 11 may be implemented by the access network device 1000 shown in FIG. 15. For example, the sending unit shown in FIG. 11 may be implemented by the transmitter shown in FIG. 15, and the receiving unit may be implemented by the receiver.

In addition, this application provides a chip system. The chip system includes a processor, configured to implement functions of the terminal device in the foregoing method embodiments, for example, receive or send data and/or information in the foregoing method. In a possible design, the chip system further includes a memory. The memory is configured to store a program instruction and data that are necessary for the terminal device. The chip system may include a chip, or may include a chip and another discrete device.

This application further provides a chip system. The chip system includes a processor, configured to implement functions of the access network device in the foregoing method embodiments, for example, receive or send data and/or information in the foregoing method. In a possible design, the chip system further includes a memory. The memory is configured to store a program instruction and data that are necessary for the access network device. The chip system may include a chip, or may include a chip and another discrete device.

This application provides a computer-readable storage medium. The computer-readable storage medium stores an instruction. When the instruction is run on a computer, the computer performs a corresponding procedure and/or operation that are/is performed by the terminal device in the foregoing method embodiments.

This application provides a computer-readable storage medium. The computer-readable storage medium stores an instruction. When the instruction is run on a computer, the computer performs a corresponding procedure and/or operation that are/is performed by the access network device in the foregoing method embodiments.

In addition, this application provides a computer program product. The computer program product includes computer program code. When the computer program code is run on a computer, the computer performs a corresponding procedure and/or operation that are/is performed by the terminal device in the foregoing method embodiments.

In addition, this application provides a computer program product. The computer program product includes computer program code. When the computer program code is run on a computer, the computer performs a corresponding procedure and/or operation that are/is performed by the access network device in the foregoing method embodiments.

In the foregoing embodiments, the processor may be a central processing unit (CPU), a microprocessor, an application-specific integrated circuit (ASIC), one or more integrated circuits for controlling program execution in the solutions of this application, or the like. For example, the processor may include a digital signal processor device, a microprocessor device, an analog-to-digital converter, and a digital-to-analog converter. The processor may allocate control and signal processing functions of mobile devices between these devices based on respective functions of the devices. In addition, the processor may include a function for operating one or more software programs, and the software programs may be stored in a memory.

The memory may be a read-only memory (ROM), another type of static storage device capable of storing static information and instructions, a random access memory (RAM), or another type of dynamic storage device capable of storing information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may independently exist, or may be integrated into the processor.

A transceiver may include, for example, an infrared transceiver, a using transceiver, a wireless universal serial bus (USB) transceiver, and a Bluetooth transceiver. Although not shown, the access network device can use a corresponding communications technology to send a signal (or data) by using a transmitter and/or receive a signal (data) by using a receiver.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatus, and unit, reference may be made to a corresponding process in the foregoing method embodiments. Details are not described herein.

In the several embodiments provided in this application, it should be understood that the disclosed system, apparatus, and method may be implemented in other manners. For example, the described apparatus embodiments are merely examples. For example, the unit division is merely logical function division and there may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, the function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. A method comprises:
receiving, by a terminal device within a first transmission time interval (TTI), a transport block (TB) sent by an access network device, wherein the TB comprises at least two code blocks (CBs), and wherein the at least two CBs comprise a first part of the CBs and a second part of the CBs; and
sending, by the terminal device, first feedback information and second feedback information to the access network device only when the terminal device receives the second part of the CBs within a second TTI and does not receive the first part of the CBs, wherein the first feedback information indicates whether the terminal device correctly decoded the first part of the CBs, wherein the second feedback information indicates whether the terminal device correctly decoded the second part of the CBs, and wherein the second TTI is after the first TTI in a time sequence.

2. The method according to claim 1, wherein sending the first feedback information and the second feedback information comprises sending, by the terminal device, the first feedback information to the access network device within a third TTI, and sending the second feedback information to the access network device within a fourth TTI, wherein the third TTI and the fourth TTI are different TTIs in terms of time.

3. The method according to claim 2, further comprising:
sending, by the terminal device, fourth feedback information to the access network device within the third TTI, wherein the fourth feedback information indicates whether the terminal device correctly decoded the TB; and/or sending, by the terminal device, fifth feedback information to the access network device within the fourth TTI, wherein the fifth feedback information indicates whether the terminal device correctly decoded the TB.

4. The method according to claim 1, wherein the terminal device sends the first feedback information and the second feedback information to the access network device within a fifth TTI.

5. The method according to claim 4, further comprising sending, by the terminal device, sixth feedback information to the access network device within the fifth TTI, wherein the sixth feedback information indicates whether the terminal device correctly decoded the TB.

6. The method according to claim 1, wherein the first feedback information indicates whether the terminal device correctly decoded the first part of the CBs received within the first TTI, and wherein the second feedback information indicates whether the terminal device correctly decoded the second part of the CBs received within the second TTI.

7. The method according to claim 1, wherein the first feedback information comprises a first part of the feedback information and a second part of the feedback information, wherein the first part of the feedback information indicates whether the terminal device correctly decoded the first part of the CBs received within the first TTI, wherein the second part of the feedback information indicates whether the terminal device correctly decoded the second part of the CBs received within the first TTI, and wherein the second feedback information indicates whether the terminal device correctly decoded the second part of the CBs received within the second TTI.

8. The method according to claim 1, further comprising:
sending, by the terminal device, third feedback information to the access network device when the terminal device does not receive the second part of the CBs after the first TTI,
wherein the third feedback information indicates whether the terminal device correctly decoded the TB received within the first TTI.

9. A method comprises:
receiving, by a terminal device within a first transmission time interval (TTI), a transport block (TB) sent by an access network device, wherein the TB comprises at least two code blocks (CBs), and wherein the at least two CBs comprise a first part of the CBs and a second part of the CBs; and sending, by the terminal device, first feedback information to the access network device within a third TTI when the terminal device receives the second part of the CBs sent by the access network device and does not receive the first part of the CBs within a second TTI, wherein the first feedback information indicates whether the terminal device correctly decoded the first part of the CBs received within the first TTI and the second part of the CBs received within the second TTI, wherein the second TTI is in a receive time window after the first TTI, and wherein the terminal device uses the receive time window to determine a maximum duration for waiting for the access network device to send the second part of the CBs after the first TTI.

10. The method according to claim 9, further comprising:
sending, by the terminal device, second feedback information to the access network device within a fourth TTI when the terminal device does not receive the second part of the CBs in the receive time window,
wherein the second feedback information indicates whether the terminal device correctly decoded the TB received within the first TTI, and
wherein the fourth TTI is the same as the third TTI or the fourth TTI is before the third TTI in a time sequence.

11. The method according to claim 9, further comprising:
sending, by the terminal device, third feedback information to the access network device within a sixth TTI when the terminal device, within a fifth TTI outside the receive time window, receives the second part of the CBs and does not receive the first part of the CBs,
wherein the third feedback information indicates whether the terminal device correctly decoded the TB and/or the second part of the CBs received within the fifth TTI.

12. A terminal device comprising:
a receiver configured to receive, within a first transmission time interval (TTI), a transport block (TB) sent by an access network device, wherein the TB comprises at least two code blocks (CBs), and wherein the at least two CBs comprise a first part of the CBs and a second part of the CBs; and
a transmitter configured to send first feedback information and second feedback information to the access network device only when the receiver receives the second part of the CBs and does not receive the first part of the CBs within a second TTI,
wherein the first feedback information indicates whether the terminal device correctly decoded the first part of the CBs, wherein the second feedback information indicates whether the terminal device correctly decoded the second part of the CBs, and wherein the second TTI is after the first TTI in a time sequence.

13. The terminal device according to claim 12, wherein the transmitter is further configured to send the first feedback information to the access network device within a third TTI, and send the second feedback information to the access network device within a fourth TTI, and wherein the third TTI and the fourth TTI are different TTIs in terms of time.

14. The terminal device according to claim 13, wherein the transmitter is further configured to send fourth feedback information to the access network device within the third TTI, wherein the fourth feedback information indicates whether the terminal device correctly decoded the TB, and/or wherein the transmitter is further configured to send fifth feedback information to the access network device within the fourth TTI, wherein the fifth feedback information indicates whether the terminal device correctly decoded the TB.

15. The terminal device according to claim 12, wherein the transmitter is further configured to send the first feedback information and the second feedback information to the access network device within a fifth TTI.

16. The terminal device according to claim 15, wherein the transmitter is further configured to send sixth feedback information to the access network device within the fifth TTI, and wherein the sixth feedback information indicates whether the terminal device correctly decoded the TB.

17. The terminal device according to claim 12, wherein the first feedback information indicates whether the terminal device correctly decoded the first part of the CBs received within the first TTI, and wherein the second feedback information indicates whether the terminal device correctly decoded the second part of the CBs received within the second TTI.

18. The terminal device according to claim 12, wherein the first feedback information comprises a first part of the feedback information and a second part of the feedback information, wherein the first part of the feedback information indicates whether the terminal device correctly decoded the first part of the CBs received within the first TTI, wherein the second part of the feedback information indicates whether the terminal device correctly decoded the second part of the CBs received within the first TTI, and wherein the second feedback information indicates whether the terminal device correctly decoded the second part of the CBs received within the second TTI.

19. The terminal device according to claim 12, wherein the transmitter is further configured to send third feedback information to the access network device when the receiver does not receive the second part of the CBs after the first TTI, and wherein the third feedback information indicates whether the terminal device correctly decoded the TB received within the first TTI.

* * * * *